US012259013B2

(12) United States Patent
Hunter et al.

(10) Patent No.: US 12,259,013 B2
(45) Date of Patent: Mar. 25, 2025

(54) COVER FOR A UNIVERSAL JOINT OF A DRIVESHAFT

(71) Applicants: Ryan D. Hunter, Columbia, TN (US); Caleb R. Hunter, Spring Hill, TN (US); Scott D. Hunter, Oroville, CA (US)

(72) Inventors: Ryan D. Hunter, Columbia, TN (US); Caleb R. Hunter, Spring Hill, TN (US); Scott D. Hunter, Oroville, CA (US)

( * ) Notice: Subject to any disclaimer, the term of this patent is extended or adjusted under 35 U.S.C. 154(b) by 0 days.

(21) Appl. No.: 18/482,328

(22) Filed: Oct. 6, 2023

(65) Prior Publication Data
US 2024/0255032 A1 Aug. 1, 2024

Related U.S. Application Data

(62) Division of application No. 18/174,728, filed on Feb. 27, 2023, now Pat. No. 11,796,009.

(60) Provisional application No. 63/481,857, filed on Jan. 27, 2023.

(51) Int. Cl.
*F16D 3/84* (2006.01)

(52) U.S. Cl.
CPC .......... *F16D 3/841* (2013.01); *F16D 2300/26* (2013.01)

(58) Field of Classification Search
CPC . A01B 71/08; F16D 3/84; F16D 3/841; F16D 3/843; F16D 2300/26; F16P 1/02; Y10T 74/219; Y10T 74/2191; Y10T 403/17
See application file for complete search history.

(56) References Cited

U.S. PATENT DOCUMENTS

| | | | | | |
|---|---|---|---|---|---|
| 1,428,799 | A | * | 9/1922 | Neuteboom | F16D 3/848 464/171 |
| 1,589,829 | A | * | 6/1926 | Andreassen | F16D 3/84 464/171 |
| 2,960,850 | A | * | 11/1960 | Crawford | F16D 3/841 464/178 |
| 5,870,931 | A | * | 2/1999 | Frantz | F16D 3/841 464/170 |
| 6,171,010 | B1 | * | 1/2001 | Nagashima | F16D 3/845 403/51 |
| 6,190,261 | B1 | * | 2/2001 | Powell | F16D 3/843 464/170 |

(Continued)

FOREIGN PATENT DOCUMENTS

| | | | | |
|---|---|---|---|---|
| DE | 10233509 A1 | * | 2/2004 | F16D 3/843 |
| FR | 547444 A | * | 12/1922 | F16D 3/84 |

(Continued)

*Primary Examiner* — Josh Skroupa
(74) *Attorney, Agent, or Firm* — Sisson & Banyas, Attorneys at Law, LLC; Jeffrey J. Banyas

(57) ABSTRACT

A cover for a universal joint of a driveshaft comprises a first section, a second section, at least two cover fasteners, and at least one driveshaft fastener. At least a first cover fastener of the at least two cover fasteners is configured to connect a first section first edge to a second section first edge. At least a second cover fastener of the at least two cover fasteners is configured to connect a first section second edge to a second section second edge. The at least one driveshaft fastener is configured to connect the cover to the driveshaft or a yoke thereof without any portion of the cover contacting the universal joint.

18 Claims, 10 Drawing Sheets

(56) References Cited

U.S. PATENT DOCUMENTS

| | | | | |
|---|---|---|---|---|
| 6,966,838 | B2* | 11/2005 | Herchenbach | F16D 3/841 |
| | | | | 464/17 |
| 7,758,433 | B2* | 7/2010 | Yamauchi | F16D 3/843 |
| | | | | 464/173 |
| 9,915,294 | B2* | 3/2018 | Littau | A01B 71/08 |
| 10,030,814 | B2* | 7/2018 | Wei | F16D 3/84 |
| 10,107,380 | B2* | 10/2018 | McGarry | F16D 3/843 |
| 10,309,466 | B2* | 6/2019 | Littau | F16D 3/841 |
| 11,796,009 | B1* | 10/2023 | Hunter | F16D 3/843 |
| 2005/0039940 | A1* | 2/2005 | Egan | H02G 15/013 |
| | | | | 174/659 |
| 2024/0196794 | A1* | 6/2024 | Gupta | A01B 71/08 |

FOREIGN PATENT DOCUMENTS

| | | | | |
|---|---|---|---|---|
| FR | 591918 A | * | 7/1925 | F16D 3/84 |
| WO | WO-2008126791 A1 | * | 10/2008 | F16D 3/841 |

\* cited by examiner

COVER FOR A UNIVERSAL JOINT OF A DRIVESHAFT

CROSS REFERENCES AND PRIORITIES

This Application claims priority to U.S. application Ser. No. 18/174,728 filed on Feb. 27, 2023 and U.S. Provisional Patent Application No. 63/481,857 filed on Jan. 2, 2023, the teachings of each of which are incorporated by reference herein in their entirety.

BACKGROUND

Universal joints are used in drive trains of many vehicles to connect driveshafts (or segments thereof) to various other vehicle components such as an engine, transmission, or drive axle. The universal joints are flexible joints that permit the various vehicle components—including the driveshaft (or segment thereof)—to be positioned out of a straight-line alignment with one another.

Many universal joints require lubrication and have grease fittings to accommodate such lubrication. As the drive shaft spins at high speed, the grease/oil in the universal joint is flung off the universal joint by the centrifugal force of the spinning universal joint. This grease/oil is deposited on portions of the vehicle—most notably the vehicle undercarriage—resulting in the need for repeated cleanings of the vehicle. A portion of the grease/oil is also typically deposited onto the road surface upon which the vehicle is driving which can result in damage to the road surface and/or environmental contamination and pollution.

Several solutions to prevent grease/oil from being flung off the universal joint and onto the vehicle have been proposed. The simplest of which is to dispose a flexible cover made of materials such as rubber or fabric around the portion of the vehicle driveshaft that includes the universal joint. One such solution is disclosed in United States Patent Publication No. 2009/0227383 which discloses a flexible, removable universal joint cover including a removable, reusable outer flexible shell and a removable, flexible liner.

In practice the existing solutions suffer from many defects. Most notably, the known solutions often attach to the driveshaft in a manner such that a portion of the cover comes into direct contact with the universal joint. The spinning universal joint may then damage the cover during use. This is particularly the case with covers of flexible materials such as rubber or fabric which may also be weakened or fatigued by the grease/oil flung from the universal joint as well as road debris such as rainwater, ice, rocksalt, and the like. Worse yet, the damage caused to the cover may result in full or partial loss of functionality of the universal joint as the damaged cover material may become lodged in the universal joint. In addition, many of the prior art solutions are designed as an uninterrupted cylinder which must be installed before connecting the driveshaft to other components, making repair or replacement of the cover difficult. This also limits or prevents access to the universal joint and its associated grease fitting which impedes the ability to service the universal joint.

The need exists, therefore, for a cover for a driveshaft universal joint which can withstand the harsh environments associated with the underside of a vehicle and which can be easily installed, repaired, and/or replaced.

SUMMARY

Described herein is a cover for a universal joint of a driveshaft. The cover comprises at least a first section, a second section, at least two cover fasteners, and at least one driveshaft fastener. The first section has a first section first end, a first section second end opposite the first section first end, a first section first edge extending between a first section first end first end-point and a first section second end first end-point, a first section second edge extending between a first section first end second end-point and a first section second end second end-point, a first longitudinal axis, and a first radius. The second section has a second section first end, a second section second end opposite the second section first end, a second section first edge extending between a second section first end first end-point and a second section second end first end-point, a second section second edge extending between a second section first end second-end point and a second section second end second end-point, a second longitudinal axis, and a second radius.

At least a first cover fastener of the at least two cover fasteners is configured to connect the first section first edge to the second section first edge. At least a second cover fastener of the at least two cover fasteners is configured to connect the first section second edge to the second section second edge. The at least one driveshaft fastener is configured to connect the cover to the driveshaft or to a yoke of the driveshaft without any portion of the protective cover contacting the universal joint.

In some embodiments, the first section first edge may comprise a first section first flange. Similarly, the second section first edge may comprise a second section first flange. In such embodiments, the first cover fastener may be configured to connect the first section first edge to the second section first edge by passing through the first section first flange and into the second section first flange or by passing through the second section first flange and into the first section first flange.

In certain embodiments, the first section second edge may comprise a first section second flange. Similarly, the second section second edge may comprise a second section second flange. In such embodiments, the second cover fastener may be configured to connect the first section second edge to the second section second edge by passing through the first section second flange and into the second section second flange or by passing through the second section second flange and into the first section second flange.

In some embodiments, the first section may comprise a first step-down extending from a first position along a first length of the first section to the first section second end. Similarly, the second section may comprise a second step-down extending from a second position along a second length of the second section to the second section second end. A portion of each of the first step-down and the second step-down may be configured to contact the driveshaft or a slip-joint of the driveshaft when the at least one driveshaft fastener connects the cover to the driveshaft or slip-joint.

In certain embodiments in which the at least one driveshaft fastener is configured to connect the cover to the yoke of the driveshaft, the first section second end may comprise at least one first radial flange. Similarly, in such embodiments, the second section second end may comprise at least one second radial flange. In such embodiments, the at least one driveshaft fastener may comprise at least a first U-bolt and a second U-bolt. The first U-bolt may be configured to connect the at least one first radial flange to the yoke. Similarly, the second U-bolt may be configured to connect the at least one second radial flange to the yoke.

In some embodiments, the first section may comprise a pair of first tabs extending inwardly from an interior wall of the first section. Similarly, the second section may comprise a pair of second tabs extending inwardly from an interior wall of the second section. Each of the pair of first tabs and the pair of second tabs may be configured to engage a yoke of a double cardan universal joint.

The first section and the second section may each independently be composed of a semi-rigid polymeric material. In some embodiments, the semi-rigid polymeric material may be polypropylene.

In certain embodiments, each cover fastener of the at least two cover fasteners may be a self-tapping screw.

In some embodiments, the cover may further comprise at least one additional section. Each additional section has an additional section first end, an additional section second end opposite the additional section first end, an additional section first edge extending between an additional section first end first end-point and an additional section second end first end-point, an additional section second edge extending between an additional section first end second end-point and an additional section second end second end-point, an additional section longitudinal axis, and an additional section radius.

In some embodiments, each additional section first edge may comprise an additional section first flange. Similarly, each additional section second edge may comprise an additional section second flange.

In certain embodiments, each additional section may comprise an additional section step-down extending from a position along a length of the additional section to the additional section second end.

In some embodiments in which the at least one driveshaft fastener is configured to connect the cover to the yoke of the driveshaft, each additional section first end may comprise at least one additional section radial flange, the driveshaft fastener may comprise at least a first U-bolt, and the first U-bolt may be configured to connect the at least one additional section radial flange to the yoke.

Each additional section may be composed of a semi-rigid polymeric material. In certain embodiments, the semi-rigid polymeric material may be polypropylene.

DETAILED DESCRIPTION

Disclosed herein is a cover for a universal joint of a driveshaft. The cover is described below with reference to the Figures. As described herein and in the claims, the following numbers refer to the following structures as noted in the Figures.

5 refers to a driveshaft.
10 refers to a universal joint.
12 refers to a double cardan universal joint.
20 refers to a yoke.
22 refers to a yoke of a double cardan universal joint.
100 revers to a cover.
110 refers to a first section.
111 refers to a first section first end.
112 refers to a first section second end.
113 refers to a first section first edge.
114 refers to a first section second edge.
115 refers to a first section first flange.
116 refers to a first section second flange.
117 refers to a first step-down.
118 refers to a first radial flange.
119 refers to a pair of first tabs.
120 refers to a second section.
121 refers to a second section first end.
122 refers to a second section second end.
123 refers to a second section first edge.
124 refers to a second section second edge.
125 refers to a second section first flange.
126 refers to a second section second flange.
127 refers to a second step-down.
128 refers to a second radial flange.
129 refers to a pair of second tabs.
130 refers to a cover fastener.
140 refers to a driveshaft fastener.
141 refers to a first U-bolt.
142 refers to a second U-bolt.
150 refers to a third section.
$\alpha_1$ refers to a first longitudinal axis.
$r_1$ refers to a first radius.
$\alpha_2$ refers to a second longitudinal axis.
$r_2$ refers to a second radius.

Figure 1:
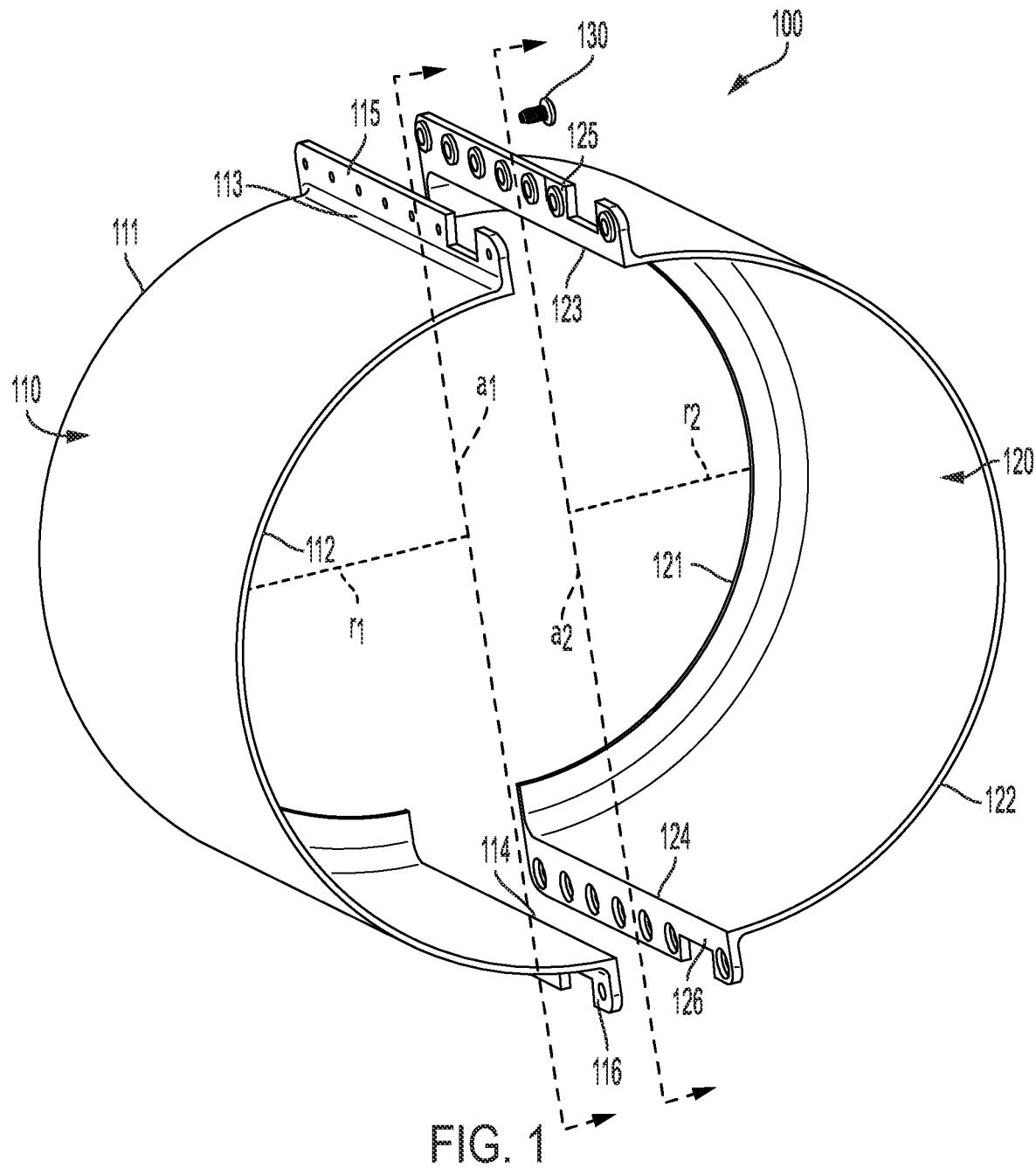
FIG. 1 is an exploded perspective view of one embodiment of a cover for a universal joint of a driveshaft.
Figure 2:
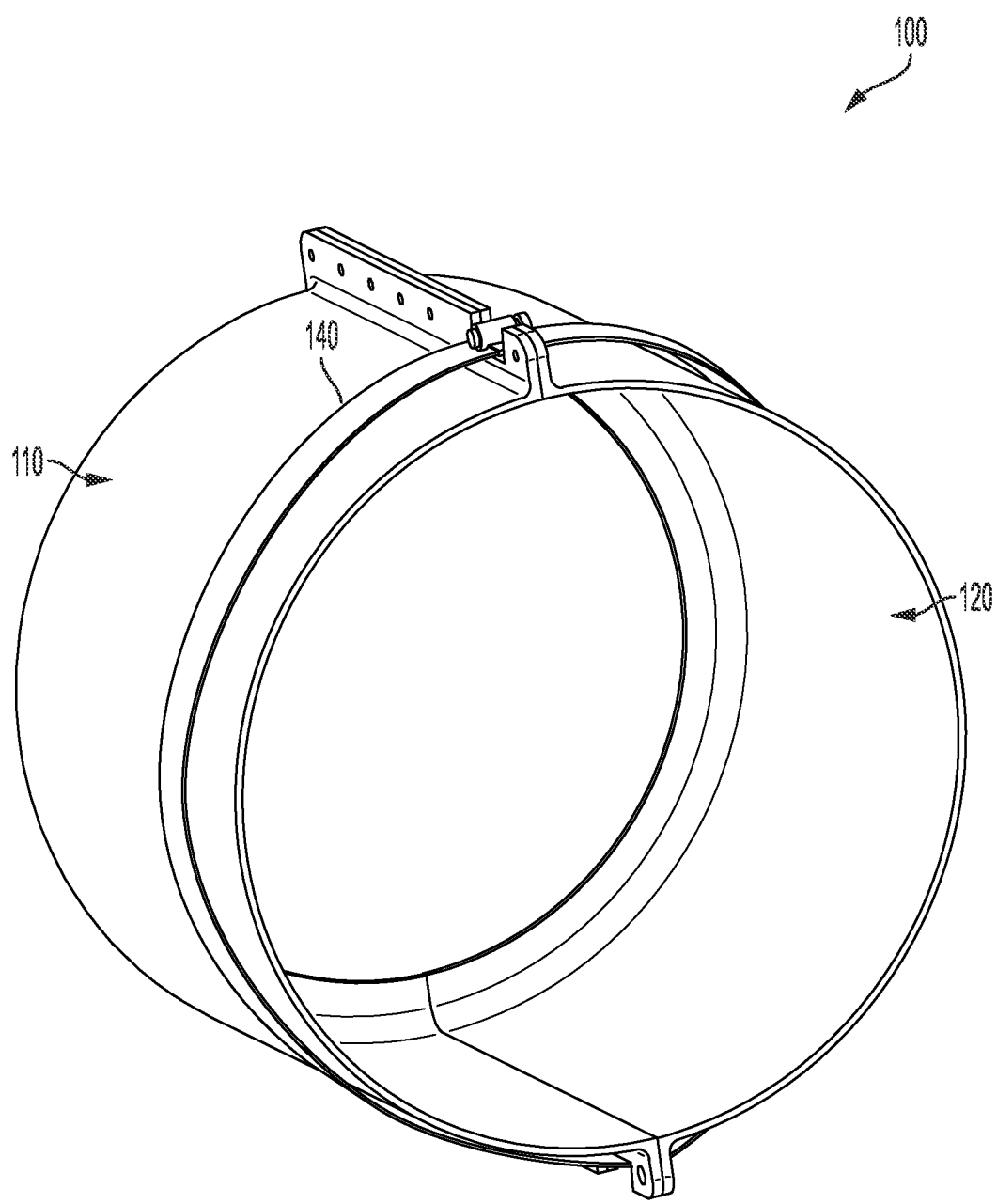
FIG. 2 is an assembled perspective view of the embodiment of a cover of FIG. 1.
Figure 5:
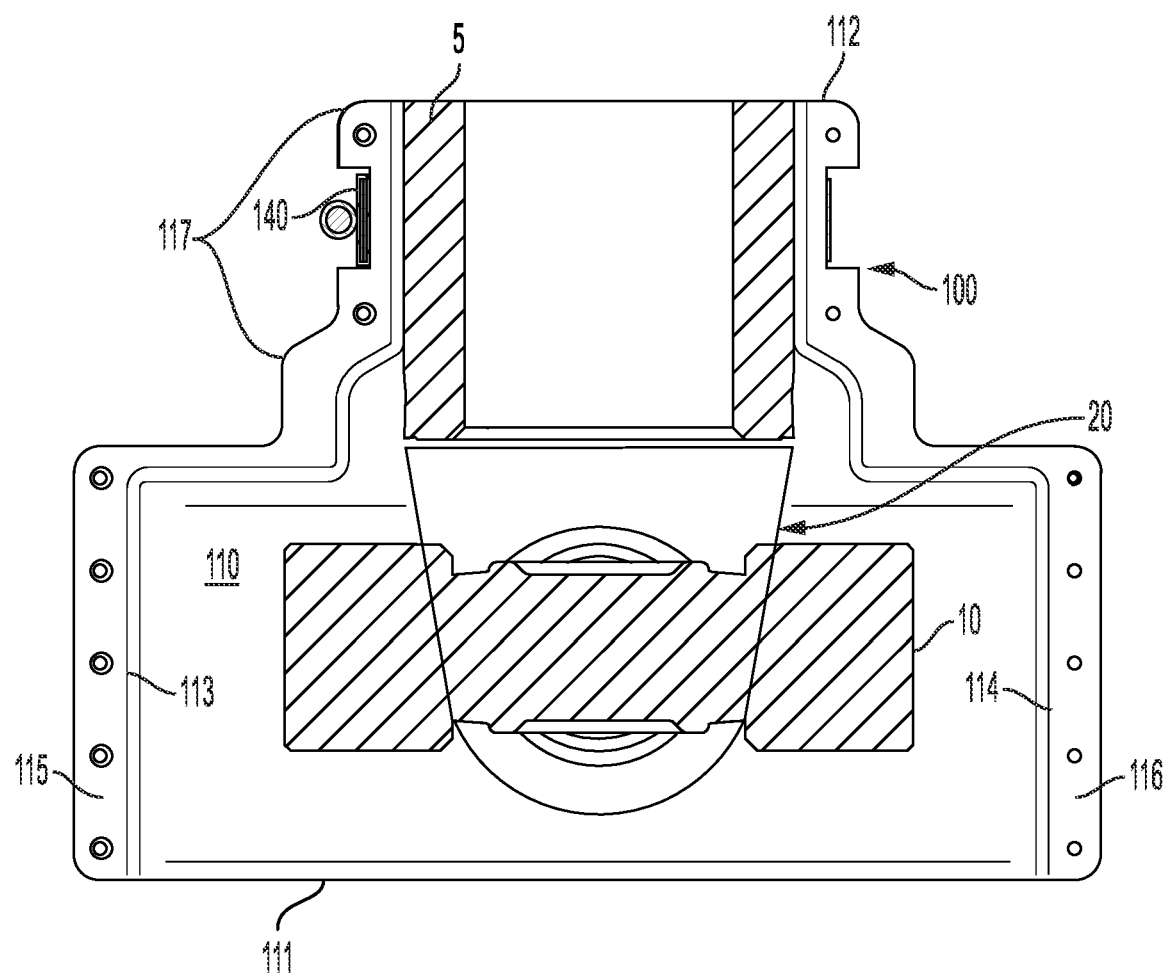
FIG. 5 is a longitudinal cross-sectional view of the embodiment of a cover of FIGS. 3 and 4 connected to a driveshaft.

FIG. 1 and FIG. 2 show one embodiment of a cover (100) for a universal joint (10 as shown in FIG. 5) of a driveshaft (5 as shown in FIG. 5) with FIG. 1 being an exploded perspective view and FIG. 2 being an assembled perspective view. As shown in FIG. 1 and FIG. 2, the cover is divided into at least two sections referred to herein as a first section (110) and a second section (120). When assembled, the first section and the second section (and optional further sections) form the cover which has a substantially cylindrical profile as shown in FIG. 2. As the assembled cover has a substantially cylindrical profile, each of the sections (including at least the first section and the second section) have a substantially semi-cylindrical profile as shown in FIG. 1.

FIG. 1 shows the first section (110) having a first section first end (111) and a first section second end (112) opposite the first section first end. A first section first edge (113) extends between first end-points of the first section first end and the first section second end. Similarly, a first section second edge (114) extends between second end-points of the first section first end and the first section second end. As the first section has a substantially semi-cylindrical profile, the first section will have a first longitudinal axis ($\alpha_1$) and a first radius ($r_1$) as shown in FIG. 1. Further, the substantially semi-cylindrical profile of the first section provides for the first section first end and the first section second end forming an arch in a range of between about 30° and about 330°, preferably in a range of between about 90° and about 270°, and more preferably in a range of between about 135° and 225°. In the embodiment shown in FIG. 1 the first section first end and the first section second end form an arch of about 180°.

The second section (120) may be similar in construction to the first section (110) as shown in FIG. 1. That is to say that the second section has a second section first end (121) and a second section second end (122) opposite the second section first end. A second section first edge (123) extends between first end-points of the second section first end and the second section second end. Similarly, a second section second edge (124) extends between second end-points of the second section first end and the second section second end. As the second section has a substantially semi-cylindrical profile, the second section will have a second longitudinal axis ($\alpha_2$) and a second radius ($r_2$) as shown in FIG. 1. Further, the substantially semi-cylindrical profile of the second section provides for the second section first end and the second section second end forming an arch in a range of between about 30° and about 330°, preferably in a range of between about 90° and about 270°, and more preferably in a range of between about 135° and 225°. In the embodiment shown in FIG. 1 the second section first end and the second section second end form an arch of about 180°.

While the Figures show a cover (100) comprising two sections, embodiments may exist having more than two sections. Each additional section—when present—may have its own independent additional section first end and additional section second end opposite the additional section first end. Each additional section—when present—may also have its own independent additional section first edge extending between first end-points of the additional section first end and the additional section second end, and additional section second edge extending between second end-points of the additional section first end and the additional section second end. As each additional section has a substantially semi-cylindrical profile, each additional section will have an additional section longitudinal axis and an additional section first radius. Further, the substantially semi-cylindrical profile of each additional section provides for each additional section first end and each additional section second end forming an arch in a range of between about 30° and about 300°, preferably in a range of between about 90° and about 240°, and more preferably in a range of between about 135° and 195°.

Regardless of the number of sections, the sum of the arches of all the section's first ends will equal 360°. Similarly, the sum of the arches of all the section's second ends will also equal 360°. As such, the sections may be attached to one another in such a way as to form a single cover (100) having a substantially cylindrical profile.

FIG. 1 also shows the cover comprising cover fasteners (130). At least a first cover fastener will be configured to connect the first section first edge (113) to the second section first edge (123). Similarly, at least a second cover fastener will be configured to connect the first section second edge (114) to the second section second edge (124). The preferred cover fastener is a self-tapping screw. Alternatively, other types of cover fastener may be utilized including screws, bolts (with or without nuts), rivets, clips, clamps, and the like.

Further shown in FIG. 2 is at least one driveshaft fastener (140). The at least one driveshaft fastener will be configured to connect the cover (100) to the driveshaft (5 as shown in FIG. 5) and/or a yoke (20 as shown in FIG. 5) of the driveshaft. Examples of a driveshaft fastener include clamps (such as worm gear clamps, spring clamps, wire clamps, ear clamps, and the like), screws, bolts, rivets, and the like. When connected to the driveshaft or yoke, no portion of the cover contacts the universal joint (10 as shown in FIG. 5).

FIG. 1 further shows the first section first edge (113) comprising a first section first flange (115), and the second section first edge (123) comprising a second section first flange (125). The first section first flange is located along at least a portion—and in some embodiments all—of the first section first edge and is aligned substantially parallel with the first longitudinal axis ($\alpha_1$). Similarly, the second section first flange is located along at least a portion—and in some embodiments all—of the second section first edge and is aligned substantially parallel with the second longitudinal axis ($\alpha_2$). Each of the first section first flange and the second section first flange are considered optional features and may not be present in certain embodiments. When the flanges are present, the at least one first cover fastener is configured to connect the first section first edge to the second section first edge by passing through the first section first flange and into the second section first flange—or by passing through the second section first flange and into the first section first flange. As such, one or both of the first section first flange and/or the second section first flange may comprise a hole passing through the respective flange through which the at least one first cover fastener may pass.

FIG. 1 further shows the first section second edge (114) comprising a first section second flange (116), and the second section second edge (124) comprising a second section second flange (126). The first section second flange is located along at least a portion—and in some embodiments all—of the first section second edge and is aligned substantially parallel with the first longitudinal axis ($\alpha_1$). Similarly, the second section second flange is located along at least a portion—and in some embodiments all—of the second section second edge and is aligned substantially parallel with the second longitudinal axis ($\alpha_2$). Each of the first section second flange and the second section second flange are considered optional features and may not be present in certain embodiments. When the flanges are present, the at least one second cover fastener is configured to connect the first section second edge to the second section second edge by passing through the first section second flange and into the second section second flange—or by passing through the second section first flange and into the first section second flange. As such, one or both of the first section second flange and/or the second section first flange may comprise a hole passing through the respective flange through which the at least one second cover fastener may pass.

Figure 3:
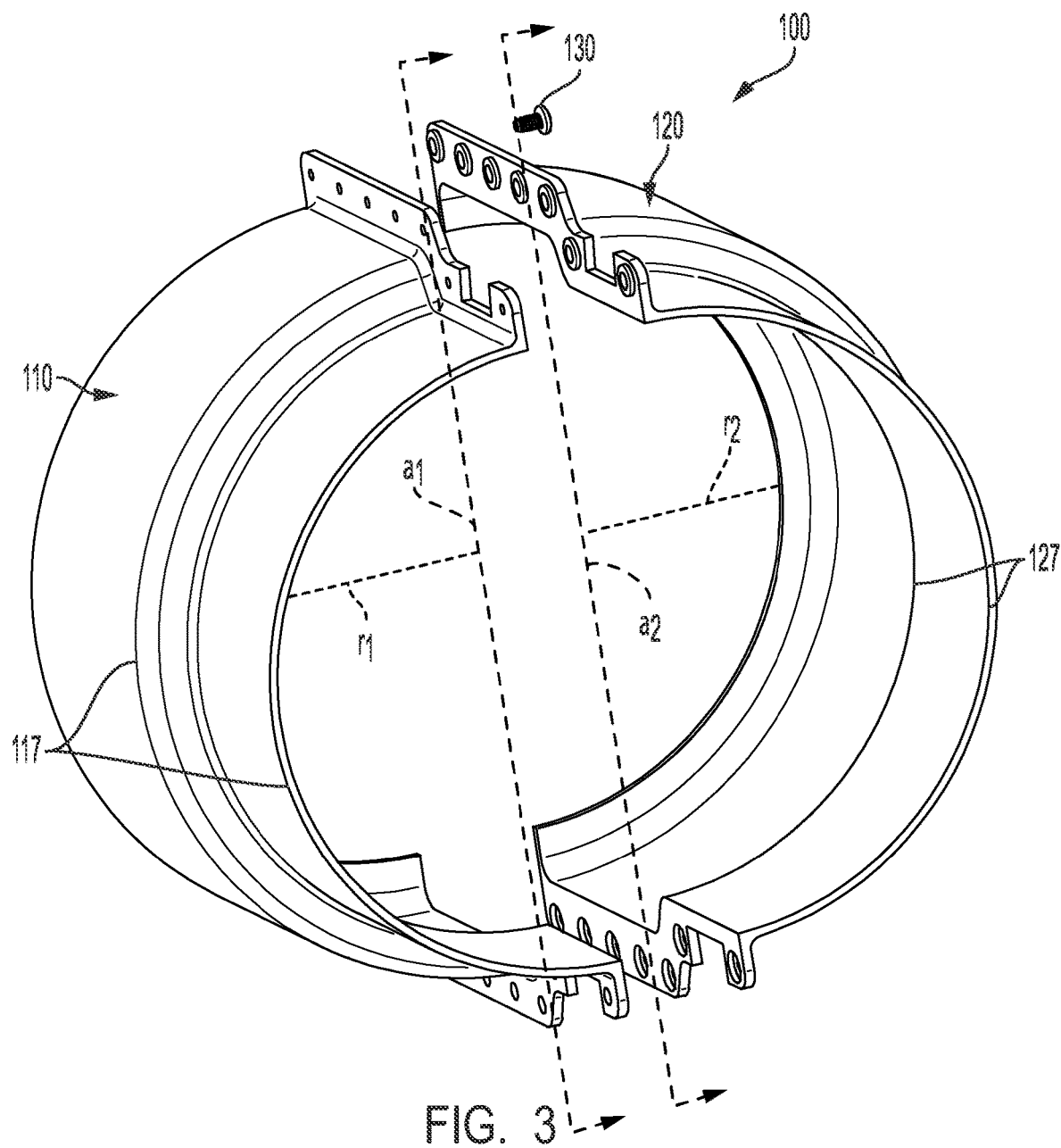
FIG. 3 is an exploded perspective view of one embodiment of a cover for a universal joint of a driveshaft.
Figure 4:
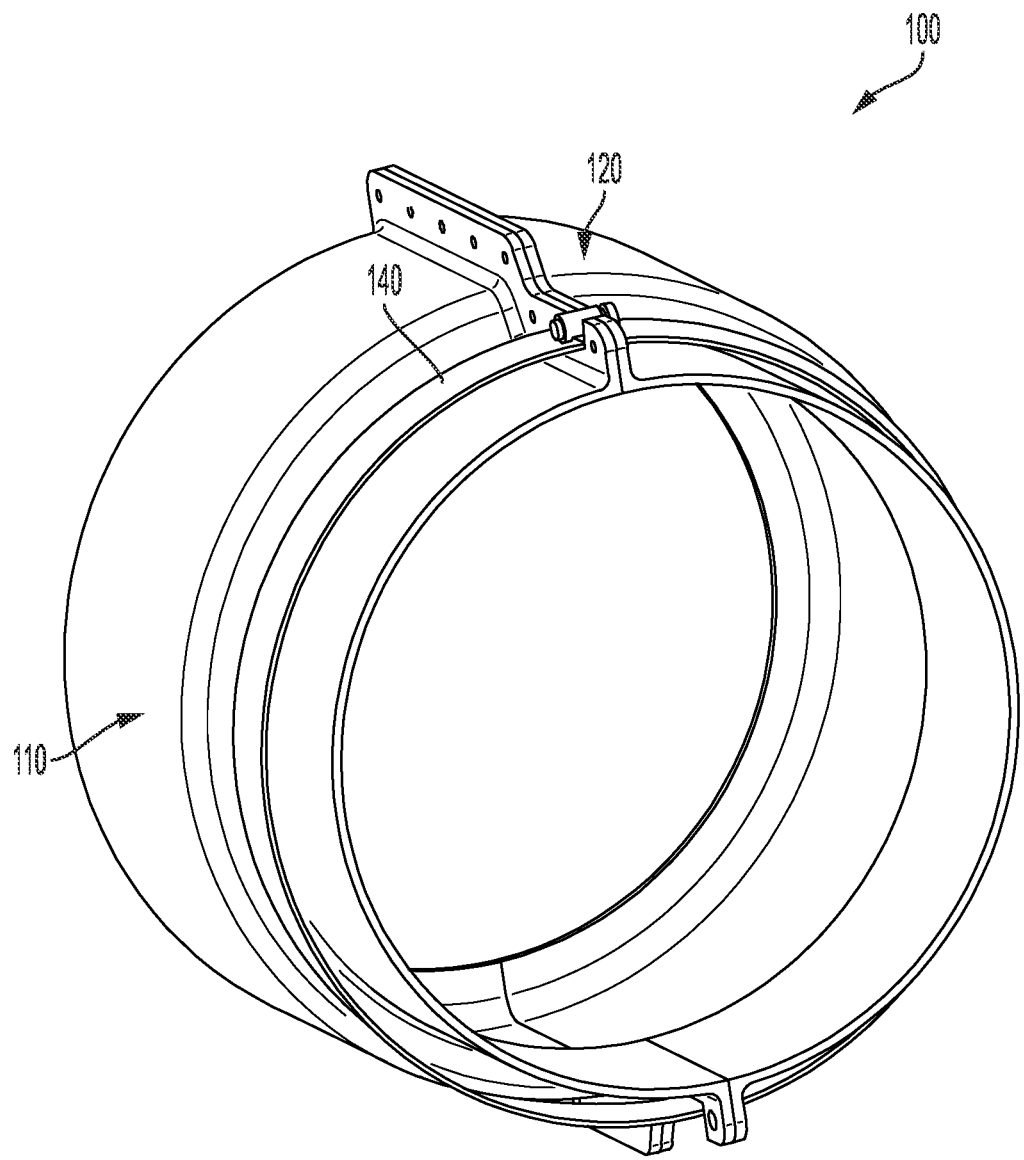
FIG. 4 is an assembled perspective view of the embodiment of a cover of FIG. 3.

FIG. 3 through FIG. 5 show embodiments of the cover (100) which include a step-down portion. As shown in FIG. 3, which is an exploded perspective view of an embodiment which includes a step-down portion, the first section (110) comprises a first step-down (117) extending from a first position along a first length of the first section to the first section second end (112). This first step-down may be considered as a third radius of the first section which is less than the first radius ($r_1$).

Similarly, the second section (120) may comprise a second step-down (127) extending from a second position along a second length of the second section to the second section second end (122) as shown in FIG. 3. This second step-down may be considered as a fourth radius of the second section which is less than the second radius ($r_2$). Preferably the fourth radius of the second section will be substantially similar or identical in dimension to the third radius of the first section.

In embodiments where the cover (100) comprises additional sections, each additional section may also include a step-down. When present, the step-down in each additional section will extend from a position along a length of the additional section to the additional section's second end. The additional section step-down may be considered as an additional section second radius which is less than the additional section radius. Preferably each additional section second radius will be substantially similar or identical in dimension to one (preferably both) of the third radius of the first section and/or the fourth radius of the second section.

When assembled—as shown in FIG. 4—the sections, including their step-downs, form the cover (100) with the cover having a first cover radius proximate to the first end, and a second cover radius proximate to the second end with the dimension of the second cover radius being less than that of the first cover radius.

FIG. 5 shows a longitudinal cross-section view of an embodiment of the cover (100) with a step-down portion connected to a driveshaft (5) or a slip joint of a driveshaft which includes a universal joint (10) and a yoke (20). While the embodiment in FIG. 5 is labelled with numbering corresponding to the first section (110), the structure and configuration applies equally to the second section.

As shown in FIG. 5, a portion of cover (100) which is in the step-down area may be configured to contact the driveshaft (5) when the at least one driveshaft fastener (140) connects the cover to the driveshaft. No portion of the cover contacts the universal joint as shown in FIG. 5.

Figure 6:
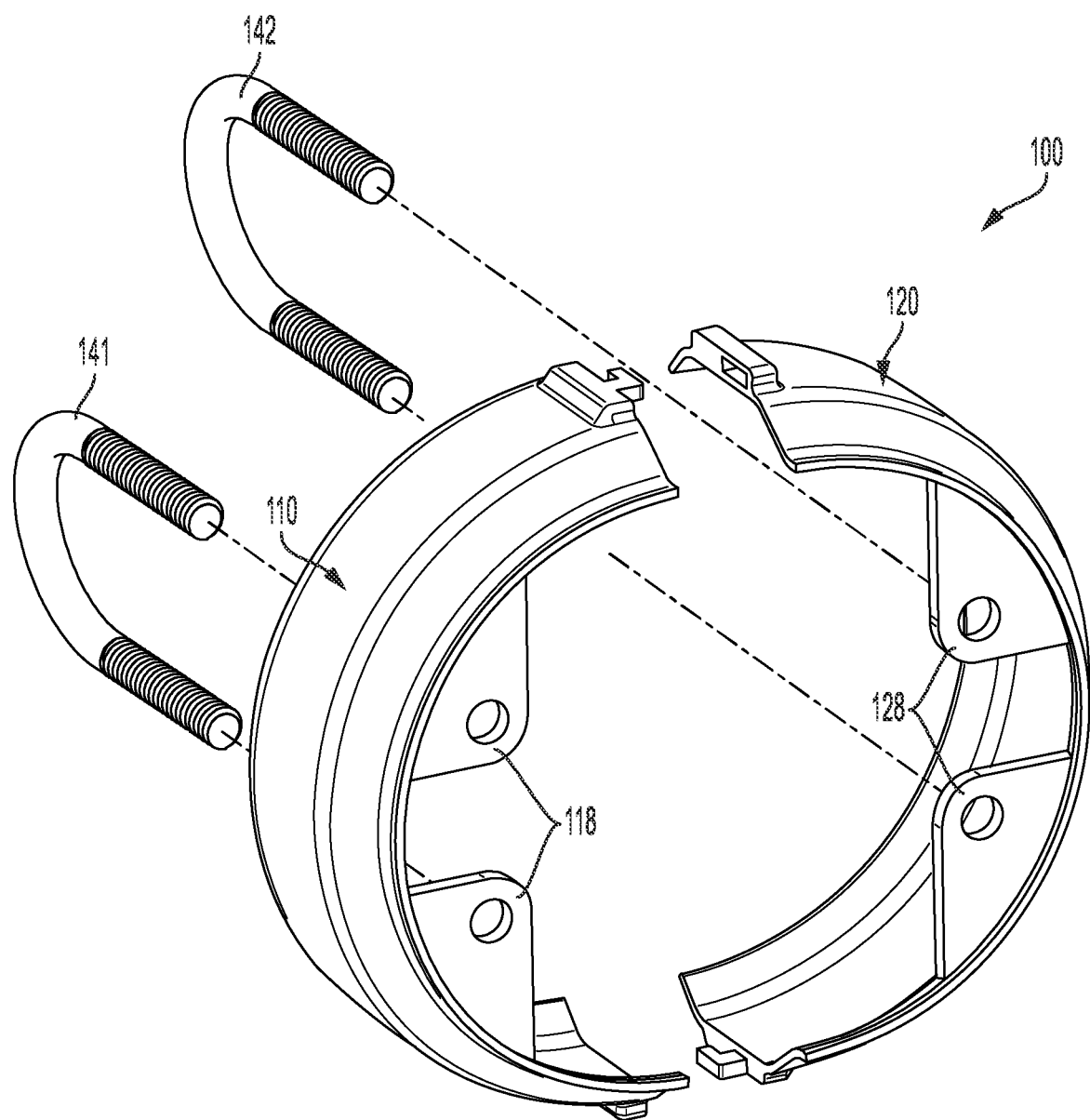
FIG. 6 is an exploded perspective view of one embodiment of a cover for a universal joint of a driveshaft.
Figure 7:
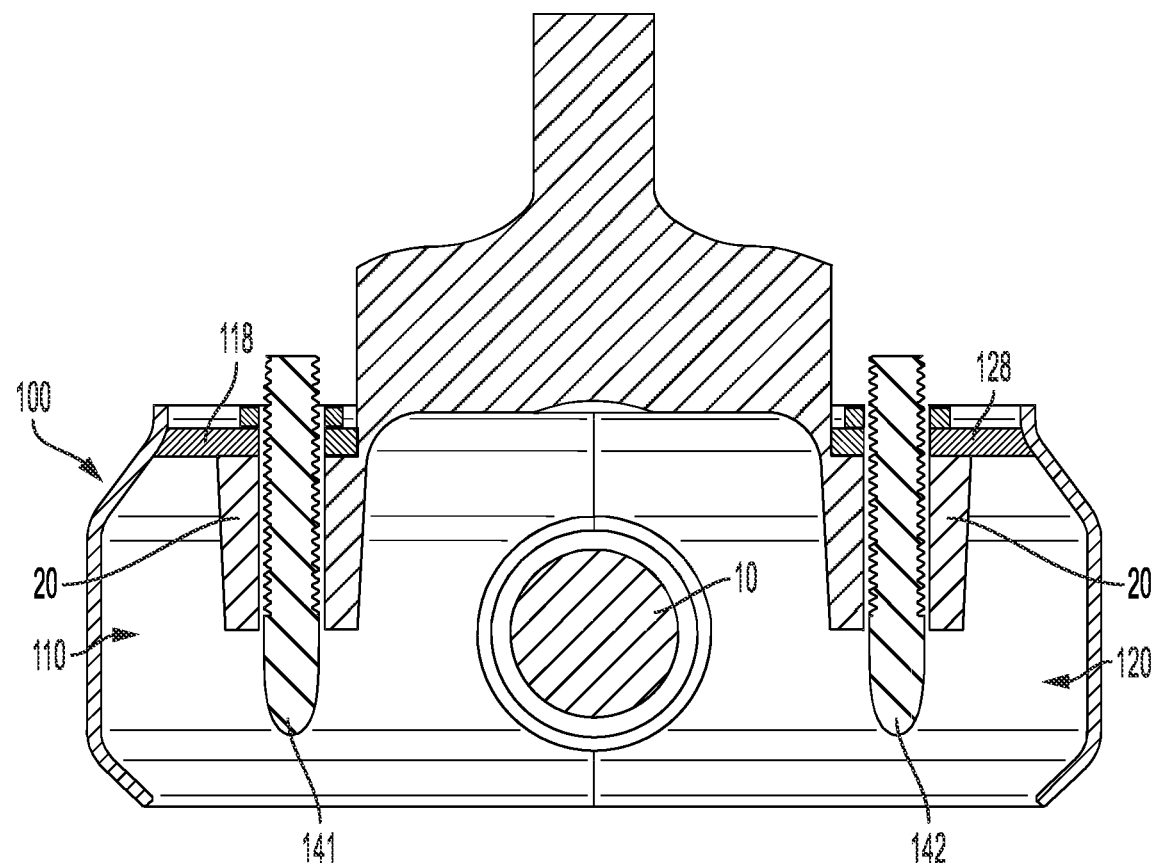
FIG. 7 is a longitudinal cross-sectional view of the embodiment of a cover of FIG. 4 connected to a yoke of a driveshaft.

FIG. 6 and FIG. 7 show embodiments of the cover (100) comprising radial flanges for connecting to yoke U-bolts. As shown in FIG. 6, which is an exploded perspective view of an embodiment which includes radial flanges, the first section second end (112 as shown in FIG. 1) comprises at least one first radial flange (118). In preferred embodiments, the first section second end will comprise two first radial flanges as shown in FIG. 6 and FIG. 7. The first radial flange(s) may extend inwardly from the first section second end along all or a portion of the arch of the first section second end. One or more first radial flange hole(s) which are configured in size, shape, and location to receive a first U-bolt (141) which connects the yoke (20) to the universal joint (10) may pass through each first radial flange.

Similarly, the second section second end (122 as shown in FIG. 1) comprises at least one second radial flange (128) as shown in the embodiment shown in FIG. 6. In preferred embodiments, the second section second end will comprise two second radial flanges as shown in FIG. 6 and FIG. 7. The second radial flange(s) may extend inwardly from the second section second end along all or a portion of the arch of the second section second end. One or more second radial flange hole(s) which are configured in size, shape, and location to receive a second U-bolt (142) which connects the yoke (20) to the universal joint (10) may pass through each second radial flange.

The embodiment shown in FIG. 6 and FIG. 7 also shows an alternative embodiment for connecting the first section (110) to the second section (120). In this embodiment, a tongue and groove connection connects the first section to the second section. A tongue being disposed on at least one end-point of one of either the first section or the second section. The opposing end-point on the other section having a groove configured to securely receive the tongue. For instance, when the second end-point of the second section comprises a tongue (as shown in FIG. 6), the second end-point of the first section will comprise a groove configured to securely receive the tongue.

In embodiments where the cover (100) comprises additional sections, one or more of the additional section(s) may comprise at least one additional section radial flange. Each additional section radial flange may extend inwardly from the additional section second end along all or a portion of the arch of the additional section second end. One or more additional section radial flange hole(s) which are configured in size shape, and location to receive a U-bolt which connects the yoke (20) to the universal joint (10) may pass through each additional section radial flange. One or more of the additional section(s) may also include a tongue and groove connection for connecting the additional section(s) to one another and/or to the first section (110) and/or the second section (120).

FIG. 7 shows a longitudinal cross-section view of an embodiment of the cover (100) that includes radial flanges for connecting to driveshaft U-bolts. While the embodiment in FIG. 7 is labelled with numbering corresponding to the first section (110), the structure and configuration applies equally to the second section.

As shown in FIG. 7, the at least one driveshaft fastener comprises at least a first U-bolt (141) and a second U-bolt (142 as shown in FIG. 6). These driveshaft fasteners are configured to connect the cover (100) to the yoke (20) of the driveshaft (5). The first U-bolt is configured to connect the first section (110) to the yoke by passing the first U-bolt through hole(s) in the first radial flange (118). The second U-bolt is configured to connect the second section (120) to the yoke by passing the second U-bolt through hole(s) in the second radial flange (128). As the radial flanges of the cover contact the yoke, no portion of the cover contacts the universal joint as shown in FIG. 7.

Figure 8:
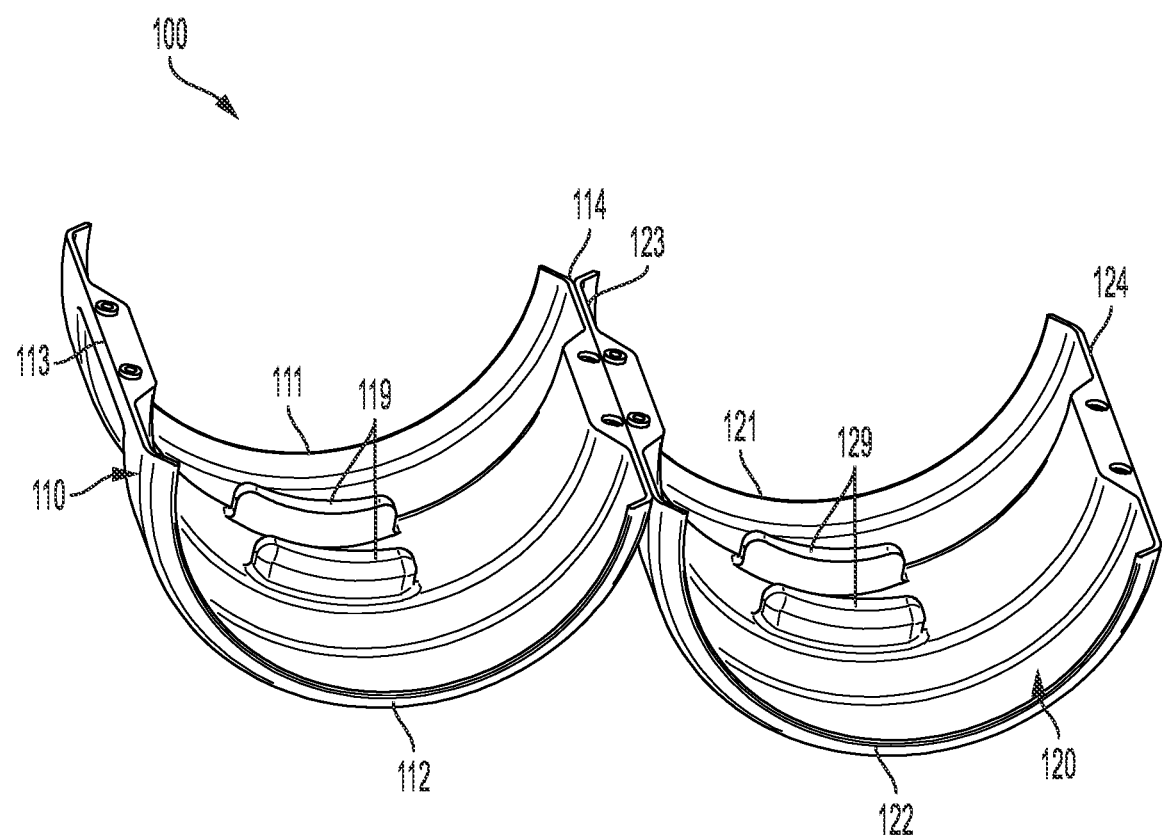
FIG. 8 is an interior view of two sections of an embodiment of a cover for a universal joint of a driveshaft.
Figure 9:
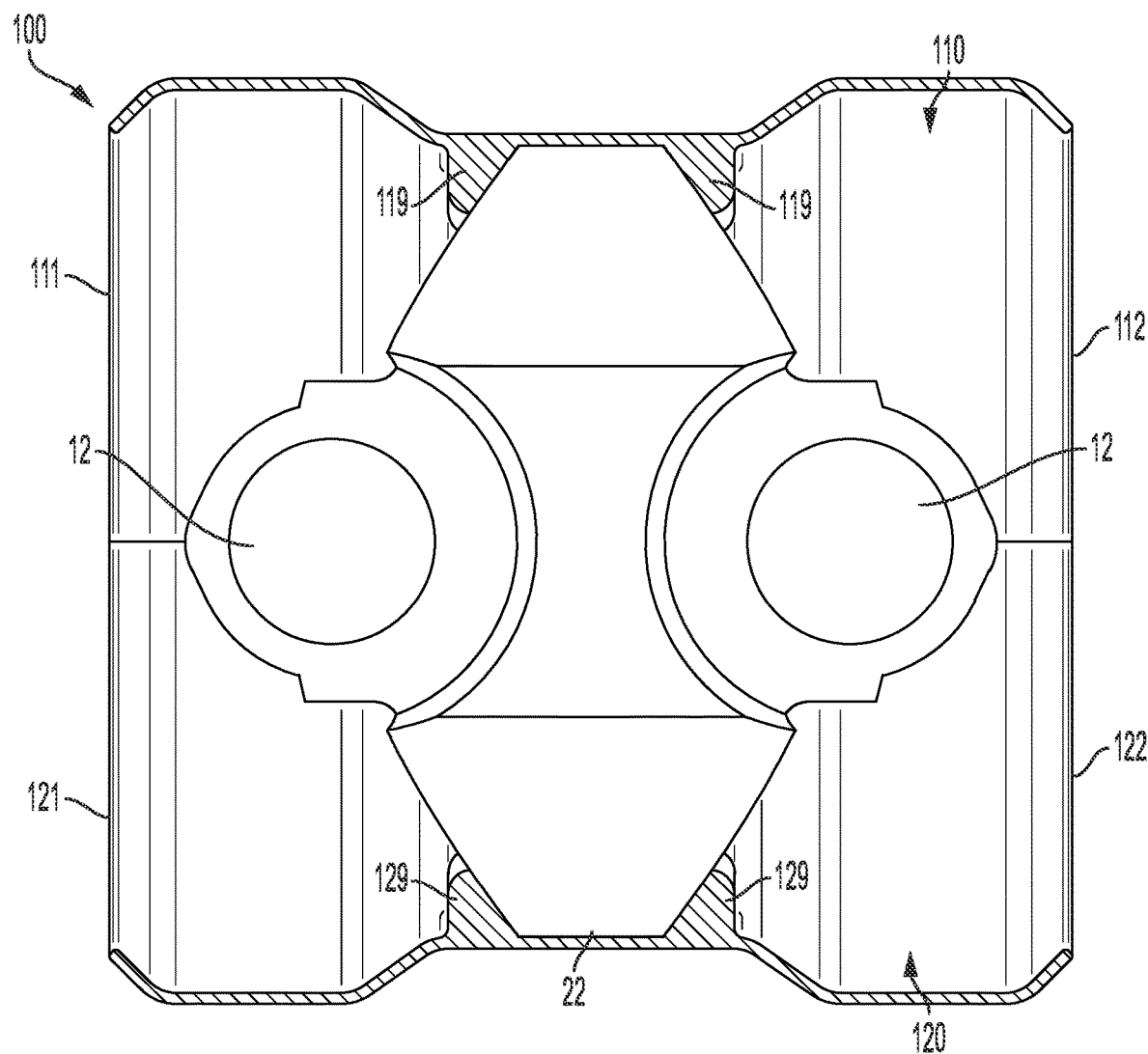
FIG. 9 is a longitudinal cross-sectional view of the embodiment of a cover of FIG. 8 connected to a driveshaft having a double cardan universal joint.

FIGS. 8 and 9 show an alternative embodiment of a cover (100) which is specifically adapted for use with a double cardan universal joint (12 as shown in FIG. 9). FIG. 8 is an exploded and partially unwrapped view of the cover. As shown in FIG. 8, the first section (110) may comprise a pair of first tabs (119). Each first tab of the pair of first tabs extends inwardly from an interior wall of the first section.

Similarly, FIG. 8 shows the second section (120) which may comprise a pair of second tabs (129). Each second tab of the pair of second tabs extends inwardly from an interior wall of the second section. Each of the pair of first tabs and the pair of second tabs is configured to engage a yoke of a double cardan universal joint (22) as shown in FIG. 9.

Figure 10:
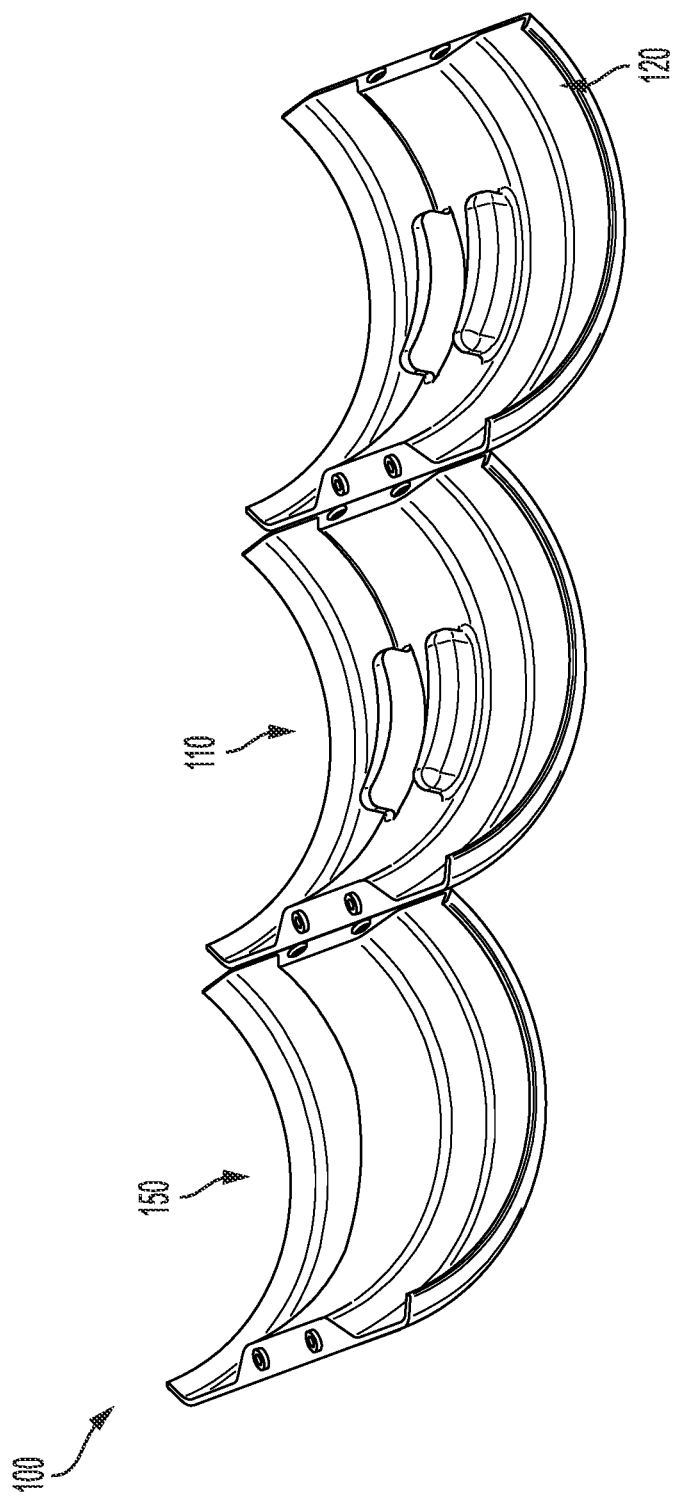
FIG. 10 is an interior view of three sections of an embodiment of a cover for a universal joint of a driveshaft.

In embodiments where the cover (100) comprises additional sections (150), as shown in FIG. 10, one or more of the additional section(s) may comprise a pair of additional section tabs. Each pair of additional section tabs may extend inwardly from an interior wall of the additional section. Each pair of additional tabs may be configured to engage a yoke of a double cardan universal joint (22).

One or more of the sections of the cover—including the first section, the second section, and the optional additional section(s)—may be fabricated of a material. Preferably, the material of each of the sections is a semi-rigid polymeric material with the preferred semi-rigid polymeric material being polypropylene. By semi-rigid it is meant that the material has a modulus of elasticity greater than 1.90 GPa. Such semi-rigid polymeric materials may be formed into the various sections using various manufacturing techniques known in the art and those yet to be developed. One such example of a manufacturing technique is injection molding.

Alternatively, one or more of the sections of the cover—including the first section, the second section, and the optional additional section(s)—may be fabricated of a stamped or otherwise formed metal. Examples of such metals include sheet steel, cast aluminum, or the like.

The covers described herein address many of the issues associated with the known solutions for preventing grease/oil from being flung off the universal joint and onto the vehicle and/or the adjacent roadway. By attaching the cover directly to the driveshaft and/or yoke with no portion of the cover contacting the universal joint, the disclosed covers are less prone to becoming damaged by the spinning universal joint. This also reduces the likelihood that debris from a damaged cover will become lodged in the universal joint resulting in partial or full loss of the universal joint's functionality. The multi-piece construction of the covers described herein also allow for the cover to be installed while the driveshaft is already connected to other components of the vehicle—such as the engine, transmission, drive axle, or other driveshaft segments—making installation, repair, and replacement easier. The multi-piece construction also allows for easy access to the universal joint and its associated grease fitting during servicing of the universal joint.

While the invention has been described as having an exemplary design, the present invention may be further modified within the spirit and scope of this disclosure. This application is therefore intended to cover any variations, uses, or adaptations of the invention using its general principles.

What is claimed is:

1. A cover (100) for a universal joint (10) of a driveshaft (5), said cover comprising:
    a first section (110) having a first section first end (111), a first section second end (112) opposite the first section first end, a first section first edge (113) extending between a first section first end first end-point and a first section second end first end-point, a first section second edge (114) extending between a first section first end second end-point and a first section second end second end-point, a first longitudinal axis ($\alpha_1$), and a first radius ($r_1$);
    a second section (120) having a second section first end (121), a second section second end (122) opposite the second section first end, a second section first edge (123) extending between a second section first end first end-point and a second section second end first end-point, a second section second edge (124) extending between a second section first end second end-point and a second section second end second end-point, a second longitudinal axis ($\alpha_1$), and a second radius ($r_1$);
    at least two cover fasteners (130); and
    at least one driveshaft fastener (140); and
    wherein at least a first cover fastener of the at least two cover fasteners is configured to connect the first section first edge to the second section first edge; and
    wherein the first section first edge is in direct face-to-face contact with the second section first edge;
    at least a second cover fastener of the at least two cover fasteners is configured to connect the first section second edge to the second section second edge; and
    wherein the first section second edge is in direct face-to-face contact with the second section second edge; and
    the at least one driveshaft fastener is configured to connect the cover to the driveshaft or to a yoke (20) of the driveshaft without any portion of the cover contacting the universal joint.

2. The cover of claim 1, wherein the first section first edge comprises a first section first flange (115), the second section first edge comprises a second section first flange (125), and the first cover fastener is configured to connect the first section first edge to the second section first edge by passing through the first section first flange and into the second section first flange or by passing through the second section first flange and into the first section first flange.

3. The cover of claim 2, wherein the first section second edge comprises a first section second flange (116), the second section second edge comprises a second section second flange (126), and the second cover fastener is configured to connect the first section second edge to the second section second edge by passing through the first section second flange and into the second section second flange or by passing through the second section second flange and into the first section second flange.

4. The cover of claim 2, further comprising at least one additional section having an additional section first end, an additional section second end opposite the additional section first end, an additional section first edge extending between an additional section first end first end-point and an additional section second end first end-point, an additional section second edge extending between an additional section first end second end-point and an additional section second end second end-point, an additional section longitudinal axis, and an additional section radius, wherein each additional section first edge comprises an additional section first flange.

5. The cover of claim 1, wherein the first section second edge comprises a first section second flange (116), the second section second edge comprises a second section second flange (126), and the second cover fastener is configured to connect the first section second edge to the second section second edge by passing through the first section second flange and into the second section second flange or by passing through the second section second flange and into the first section second flange.

6. The cover of claim 5, further comprising at least one additional section having an additional section first end, an additional section second end opposite the additional section first end, an additional section first edge extending between an additional section first end first end-point and an additional section second end first end-point, an additional section second edge extending between an additional section first end second end-point and an additional section second end second end-point, an additional section longitudinal axis, and an additional section radius, wherein each additional section second edge comprises an additional section second flange.

7. The cover of claim 1, wherein the first section comprises a first step-down (117) extending from a first position along a first length of the first section to the first section second end, and the second section comprises a second step-down (127) extending from a second position along a second length of the second section to the second section second end.

8. The cover of claim 7, wherein a portion of each of the first step-down and the second step-down is configured to contact the driveshaft or a slip-joint of the driveshaft when the at least one driveshaft fastener connects the cover to the driveshaft or slip-joint.

9. The cover of claim 7, further comprising at least one additional section having an additional section first end, an additional section second end opposite the additional section first end, an additional section first edge extending between an additional section first end first end-point and an additional section second end first end-point, an additional section second edge extending between an additional section first end second end-point and an additional section second end second end-point, an additional section longitudinal axis, and an additional section radius, wherein each additional section comprises an additional section step-down extending from a position along a length of the additional section to the additional section second end.

10. The cover of claim 1, wherein the first section and the second section are each independently composed of a semi-rigid polymeric material.

11. The cover of claim 10, wherein the semi-rigid polymeric material is polypropylene.

12. The cover of claim 1, wherein the first section and the second section are each independently composed of a metal material selected from the group consisting of steel and aluminum.

13. The cover of claim 1, wherein each cover fastener of the at least two cover fasteners is a self-tapping screw.

14. The cover of claim 1, further comprising at least one additional section having an additional section first end, an additional section second end opposite the additional section first end, an additional section first edge extending between an additional section first end first end-point and an additional section second end first end-point, an additional section second edge extending between an additional section first end second end-point and an additional section second end second end-point, an additional section longitudinal axis, and an additional section radius.

15. The cover of claim 14, where each additional section is composed of a semi-rigid polymeric material.

16. The cover of claim 15, wherein the semi-rigid polymeric material is polypropylene.

17. The cover of claim 14, wherein each additional section is composed of a metal material.

18. The cover of claim 17, wherein the metal material is selected from the group consisting of steel and aluminum.

* * * * *